United States Patent
Piper et al.

[11] Patent Number: 5,922,151
[45] Date of Patent: *Jul. 13, 1999

[54] POLYURETHANE SKATE WHEEL WITH SHAPED FOAM CORE

[75] Inventors: Neal Piper; Tom Peterson, both of Huntington Beach, Calif.

[73] Assignee: The Hyper Corporation, Santa Ana, Calif.

[*] Notice: This patent is subject to a terminal disclaimer.

[21] Appl. No.: 08/890,097

[22] Filed: Jul. 11, 1997

Related U.S. Application Data

[63] Continuation-in-part of application No. 08/680,728, Jul. 12, 1996, which is a continuation-in-part of application No. 08/595,844, Feb. 2, 1996, Pat. No. 5,641,365, which is a continuation-in-part of application No. 08/502,828, Jul. 14, 1995, Pat. No. 5,632,829, which is a continuation-in-part of application No. 08/354,374, Dec. 12, 1994, Pat. No. 5,630,891.

[51] Int. Cl.[6] ............................................... A63C 17/22
[52] U.S. Cl. .......................... 152/310; 152/313; 152/318; 152/DIG. 18; 301/5.3
[58] Field of Search ............................ 152/310, 311, 152/312, 313, 323, DIG. 18, 318; 301/5.3

[56] References Cited

U.S. PATENT DOCUMENTS

| | | |
|---|---|---|
| 271,785 | 2/1883 | Burton ..................................... 301/5.3 |
| 988,533 | 4/1911 | Zverina . |
| 1,227,791 | 5/1917 | Huebner . |
| 1,544,639 | 7/1925 | Fowler ..................................... 152/310 |
| 3,396,773 | 8/1968 | Alderfer ................................... 152/313 |
| 3,605,848 | 9/1971 | Lombardi et al. ...................... 152/310 |
| 4,033,395 | 7/1977 | Berg et al. .............................. 152/310 |
| 4,071,279 | 1/1978 | Chung . |
| 4,183,156 | 1/1980 | Rudy . |
| 4,287,250 | 9/1981 | Rudy . |
| 4,387,071 | 6/1983 | Kirkhuff . |
| 4,447,093 | 5/1984 | Cunard et al. . |
| 4,909,972 | 3/1990 | Britz ....................................... 152/310 |
| 5,028,058 | 7/1991 | Olson . |
| 5,073,444 | 12/1991 | Shanelec . |
| 5,310,250 | 5/1994 | Gonsior . |
| 5,560,685 | 10/1996 | De Bortoli . |
| 5,567,019 | 10/1996 | Raza et al. . |
| 5,573,309 | 11/1996 | Bekessy . |
| 5,632,829 | 5/1997 | Peterson et al. ........................ 152/165 |

FOREIGN PATENT DOCUMENTS

96/18513   6/1996   WIPO .

*Primary Examiner*—Geoffrey L. Knable
*Attorney, Agent, or Firm*—Fulwider Patton Lee & Utecht, LLP

[57] ABSTRACT

An in-line skate wheel having a shaped foam core which cooperates with load bearing side walls to dictate degrees of flexure of such walls in response to loading thereof from different directions. The wheel structure includes a polyurethane tire body which encapsulates a foam mandrel and a hub.

10 Claims, 4 Drawing Sheets

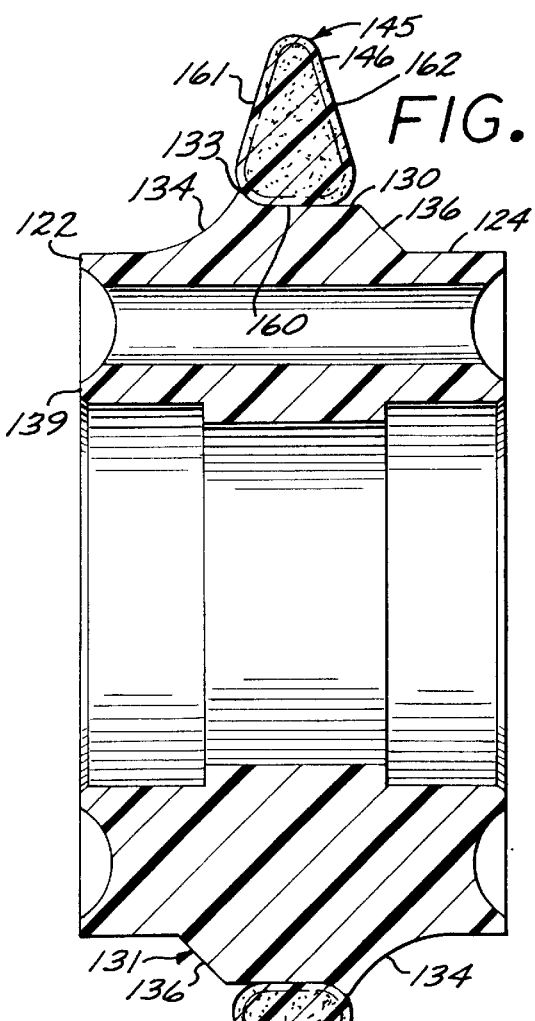
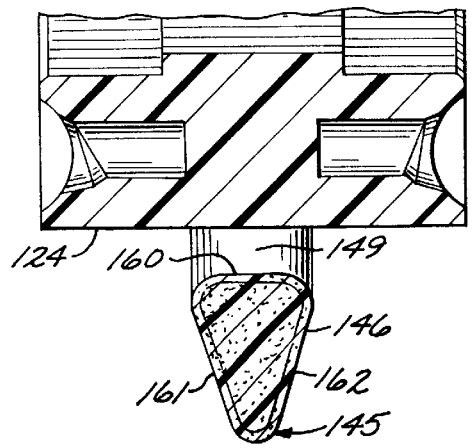
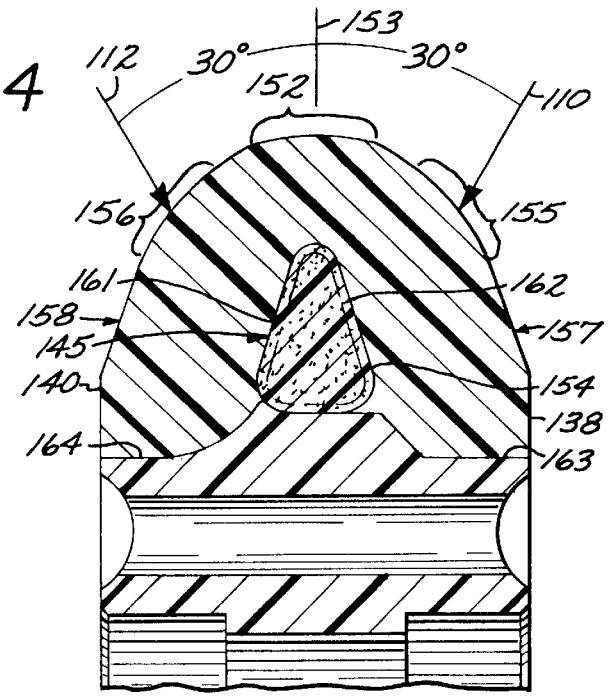
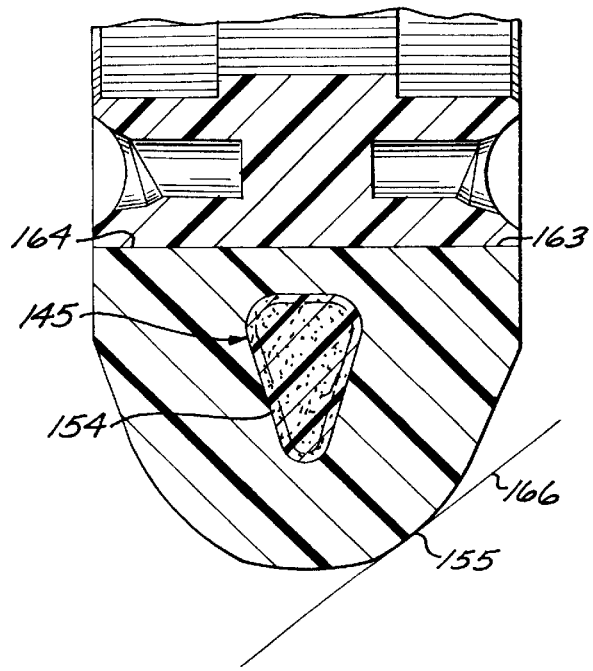

POLYURETHANE SKATE WHEEL WITH SHAPED FOAM CORE

This application is a continuation-in-part of our U.S. application Ser. No. 08/680,728 filed Jul. 12, 1996, which is a continuation-in-part of U.S. application Ser. No. 08/595,844, filed Feb. 2,1996, now U.S. Pat. No. 5,641,365, which is a continuation-in-part of U.S. application Ser. No. 08/502,828, filed Jul. 14, 1995, now U.S. Pat. No. 5,632,829, which is, in turn, a continuation-in-part of U.S. application Ser. No. 08/354,374, filed Dec. 12, 1994, now U.S. Pat. No. 5,630,891.

BACKGROUND OF THE INVENTION

1. Field of the Invention

This invention relates to a skate wheel and more particularly to a high performance in-line skate wheel having a shaped foam core which cooperates with the surrounding polyurethane load bearing side walls to dictate degrees of compression of the flexure of such walls in response to loading thereof from different directions.

2. Description of the Prior Art

Roller skates and roller skate wheels have been known in the art. Early roller skates incorporated four wheels disposed in a box-like pattern. Inflatable rubber roller skate wheels encased in a thin rubber wall tire, such as that disclosed in U.S. Pat. No. 988,533 to Zverina, was proposed as a simple, durable wheel. Such wheels failed to gain general acceptance.

In the past, many skate wheels were constructed of rubber. The availability of polyurethane in skate wheel construction has enhanced the enjoyment and popularity of outdoor skating. The typical roller skates having four wheels in a box-like pattern do not allow for the freedom of movement experienced by ice skaters utilizing single blade skates. It was thus proposed to mount the roller skate wheels in a line along the skate frame to achieve mobility which closely mimicked the movement of an ice skate. Since that time, "in-line roller skates" have become one of the most popular recreational and physical fitness activities in the United States, and elsewhere. In-line skating has also developed into a highly sophisticated and technologically advancing commercial market.

The recreational skater often travels a variety of terrains ranging from concrete and wood to more bumpy and uneven surfaces such as asphalt which may exhibit bumps, pits and even wide cracks with vegetation growing therein. The main concern experienced by the recreational skater is to obtain a comfortable ride while skating socially, participating in physical fitness or even just a way to reach a destination. This skater requires a resilient wheel which is light weight and shock resistant. More experienced skaters, such as competitive skaters, employ in-line skates for sporting purposes such as hockey or road racing. Dancers typically prefer relatively hard tire bodies since some slippage is an acceptable compromise for the performance required. On the other hand, the high speed skating acrobatic maneuvers normally associated with hockey players could be best performed with a tire having relatively little resistance to deformation when in the upright position normally associated with a relatively straight skating path but which, when leaned over on the side, exhibit a greater degree of deformation to generate a larger footprint for more effective gripping to avoid slippage.

Polyurethane in-line skate wheels proposed in the past have typically been constructed by injection molding to form a hub surrounded by a tire body of solid urethane. It is desirable that such wheels provide a durable and relatively smooth ride over many types of terrains. Such tire bodies are necessarily restricted in that the performance characteristics cannot be easily and inexpensively adjusted during the manufacturing process to accommodate the many different support surfaces and loads encountered by a skate employed in a demanding sport such as, for instance, hockey.

It has been proposed to construct an in-line skate wheel with a nylon hub having an annular gridwork defining axially through passages for receiving cross segments of urethane embodied in a tire body. A wheel of this type is shown in U.S. Pat. No. 5,028,058 to Olson. Wheels of this type, while satisfactory for their intended purposes, do not typically exhibit the durability and performance characteristics important to aggressive athletic roller skating activities, such as roller hockey and the like.

Other efforts to improve polyurethane wheels have led to the proposal that polyurethane be injected into a mold around a hard polyurethane hub having an annular grid work for interlocking of the resultant tire body with the hub to create an interlocked solid tire body. A device of this type is shown in U.S. Pat. No. 5,312,844 to Gonsior. Wheels of this type, while being acceptable for recreational skating activity, are relatively expensive to manufacture and do not provide a tire which will deform to different degrees when loaded from different directions to provide correspondingly different resistances to rolling and different gripping characteristics.

Other efforts in polyurethane wheel design has led to the proposal of a hard polyurethane hub formed with a radially projecting annular ring configured with transverse through bores for flow of a molten thermoplastic polyurethane tire material therethrough for mechanical interlocking thereof. A wheel of this type is shown in U.S. Pat. No. 5,567,019 to Raza. Wheels of this type, while satisfactory for recreational skating, are relatively expensive to manufacture and exhibit a relatively hard peripheral surface which provides for only limited cushioning and flexibility to accommodate irregular terrain and flexure to exhibit a relatively large foot print upon tight high speed turns for positive gripping of the underlying terrain.

Still other attempts have been made to provide a tire which is capable of optimal performance over a variety of skating surfaces, skating conditions and skating maneuvers as recited in U.S. Pat. No. 5,573,309 to Bekessy. This patent discloses a wheel with a hub having a tapered tire deflection controlling rim encapsulated by a tire formed of a solid resilient material such as urethane. The tire defection controlling rim extends radially in an annular fashion from lateral tire receiving shoulders and cooperates with the surrounding tire body to influence tire deflection. During straight line skating, when the wheels roll in a substantially vertical orientation, the effective vertical tire thickness is minimized and tire deflection is limited to keep frictional resistance low. However when the skater leans the tire over during turning maneuvers the rigid deflection controlling features allows for only limited tire deformation capability thus limiting the gripping characteristic of the tire.

Other designs have led to cushioned wheels which incorporate shock absorbing annular elements located between the outer walls of a hub and the inner surfaces of two half shells. The half shells also create a cavity which slidably receives a diaphragm which extends radially outwardly from the hug. A covering layer of thermosetting polyurethane forms a tire which does not contact the hub but instead surrounds the outer surfaces of the two half shells. A wheel of this type is show in U.S. Pat. No. 5,560,685 to De Bortoli. In operation these wheels require relatively complex component interaction are relatively expensive to manufacture.

In recognition of the desirability of an in-line skate wheel which combines the resiliency and performance of a polyurethane wheel with the enhanced grip, durability and shock absorption properties associated with hollow body wheel construction and which can be casted from thermoplastic polyurethane, applicants propose a solution in U.S. Pat. No. 5,630,891, assigned to the assignee of the instant application. That patent discloses an in-line skate wheel with an adjustable toric bladder encapsulated in a thermoplastic polyurethane wheel body. Pressure in the bladder is adjustable through the use of a valve system. Such a wheel allows the skater to adjust wheel performance to match his or her needs for the particular skating maneuver to be undertaken. Since the skater has multiple performance options available without purchasing multiple wheels and without having to manually change the skate wheels, such a wheel is versatile, cost effective and convenient. While having important commercial applications, it is recognized that such an adjustable pneumatic in-line skate wheel requires the skater to manipulate the wheel each time skate conditions change and the wheel itself is relatively costly to manufacture.

Another form of an in-line skate wheel with similar urethane and pneumatic benefits can be found U.S. Pat. No. 5,641,365, also assigned to the assignee of the instant application. In that application, a pre-pressurized pneumatic in-line skate wheel of integral construction was shown consisting of an hub mounting an annular toric bladder via a plurality of radially projecting spoke-like bladder rods encapsulated in a thermoplastic polyurethane tire body. It is a characteristic of such pressurized bladders that when pressurized they tend to take a round cross sectional shape so that the resilient wheel, while light weight and presenting excellent shock absorptive characteristics, is limited in ability to adjust the shape of the cross sectional interior and consequent shape of the tire wall for preferential flexing of different portions thereof as loads are applied thereto from different directions.

In other areas of the art, such as in the construction of variable pressure athletic shoes, it has been known to provide elastomeric bladders configured with multiple discrete chamber or open cell elastomeric foam having inlet and outlet valves. Devices of this type are shown in U.S. Pat. Nos. 4,183,156 and 4,287,250 to Rudy and U.S. Pat. No. 5,144,708 to Pekar. However, such bladders have not been generally adapted to or employed in skate wheel construction.

Thus, there exists a need for a skate wheel which can be inexpensively molded from thermoset polyurethane to provide a thick cushion like load bearing wall having a polygonal in cross section annular cavity cooperating to provide such wall with different degrees of flexure depending on whether loaded along the central plane of the wheel or at an acute angle to such central plane.

This need could be best satisfied by an in-line skate wheel which combines the benefits of a large deflection when the wheel is leaned over on a high speed turn to thus grip the support surface but which will compress only slightly when oriented in an upright position normally associated with straight line skating to thus minimize resistance to rolling.

SUMMARY OF THE INVENTION

The invention is an in-line roller skate wheel having a thick polyurethane tire wall formed on a hub around a shaped foam core mandrel insert which cooperates with the surrounding tire body to provide a polygonal annular cavity which may be filled by the compressible core. The encapsulation space defined by such core cooperates with the tire body to form deflectable load bearing side walls which flex to provide varying size footprints of the wheel relative to the contact surface depending on the direction from which the wheel is loaded. This enables the wheel to provide an improved range of performance characteristics relative to specific maneuvers encountered during skating. More specifically the present invention allows for a more cost effective manufacturing process and thereby a cost effective alternative in line skate wheel that functions well both at high speed straight line skating and through high speed cornering on a variety of surfaces, and under a variety of conditions and in a variety of skating maneuvers.

In one embodiment, the wheel construction is such that a polygonal in cross section annular foam core mandrel is constructed with an integral skin which limits outgassing during the exothermic reaction which takes place during open cast molding of the thermoset polyurethane tire. During manufacture air trapped by the integral skin within the foam core mandrel will be heated by the exothermic reaction of the liquid polyurethane flowed into the mold and to surround the hub and the mandrel.

The wheel construction includes a hard urethane hub having a radially outwardly facing rim surface configured with a plurality of circumferentially spaced, radially projecting ribs configured at their respective radially distal extent with axially extending support surfaces defining centering grooves, the ribs being formed therebetween with axially extending flow passages. A shaped annular foam insert or mandrel is formed with a polygonal cross section which may be triangular to be configured with a base that nests on the centering grooves. The foam mandrel is preferably constructed of closed cell polyurethane foam and is formed with an integral skin which forms a gas barrier to resist out gassing from the closed cell construction during manufacture and define a gas filled pressurized chamber. The foam filled chamber serves to cooperate with the parabolic exterior configuration of the tire body walls formed thereabout to establish a preferential cross sectional shape for such walls to provide for minimal flexing of the radially distal extent of such tire body upon loading in an upright position and generates flexure of the curved flanking wall portions during cornering maneuvers to thus provide a first relatively small footprint during relatively straight line skating with the wheel relatively erect and a larger footprint when the wheel is laid over up to about 30° from the vertical and loaded with a heavy load. In manufacture, the foam mandrel is seated on centering seats formed on the distal ends of ribs projecting radially outwardly from the hub which cooperate to position the mandrel circumferentially about the rim surface along the axially central plane. The hub and mandrel are placed as an assembly in a cast mold and liquid polyurethane flowed thereinto gravity feed to flow around the insert, through the axial passages thus heating the insert to cause air trapped in the cells thereof to expand thereby raising the pressure within the skin to cooperate in resisting the pressures and forces generated by the liquid urethane and maintain the integrity of the cavity defined by the insert.

It will be appreciated that the preconditioned cavity or encapsulation space formed by the foam core mandrel cooperates with the surrounding tire body material to provide an in-line skate wheel which is optimized for both straight line speed and maneuverability in turns.

BRIEF DESCRIPTION OF THE DRAWINGS

FIG. 4 is an enlarged cross-sectional view taken along line 4—4 of FIG. 3;

FIG. 5 is an enlarged cross-sectional view taken along line 5—5 of FIG. 3;

FIG. 6 is a cross-sectional view, similar to FIG. 4, but showing the tire body molded on the hub around the shaped foam core mandrel;

FIG. 7 is a cross-sectional view, similar to FIG.5, but showing the tire body molded on the hub around the shaped foam core mandrel; perspective view of a shaped foam core mandrel;

DETAILED DESCRIPTION OF A PREFERRED EMBODIMENT

Figure 1:
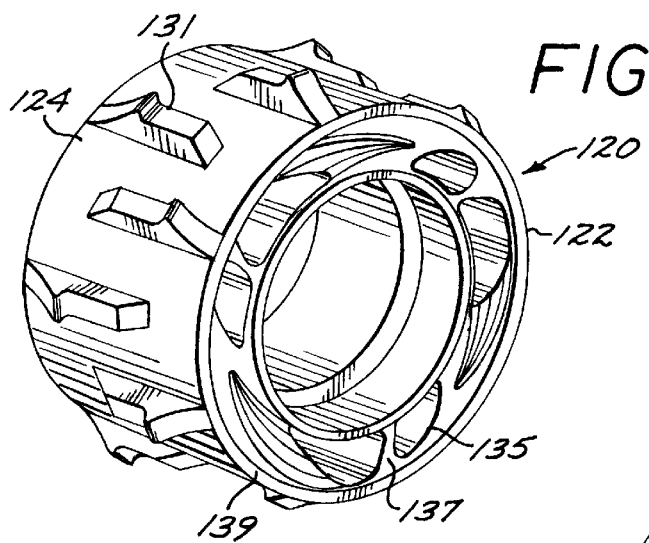
FIG. 1 is a perspective view of a hub which may be incorporated in the skate wheel embodying the present invention.

Referring to FIGS. 4–7, the high performance polyurethane wheel of the present invention includes, generally, a hard polyurethane hub 120 formed with a plurality of radial ribs 131 which mount at the radially outer extent thereof an annular compressible foam mandrel 145 having a triangular cross section for defining a correspondingly shaped triangular cross section annular cavity 154 within a tire body 151. Such tire body is molded about such mandrel to form a generally V shaped arch with a parabolic in cross section exterior tread surface projecting radially outwardly from the hub rim which curve symmetrically radially outwardly and axially inwardly from its opposite sides to form flanking turning shoulders 155 and 156 which converge together at an axially central plane 150 to form an axially centered apex defining annular running surface 152. It will be appreciated that the parabolic shape of the exterior tread surface complements the triangular shape of the mandrel 145 to define, in cross section, a generally U-shaped arch which, as will be described below, serves to provide a relatively high magnitude resistance to deflection by radial loads applied to such running surface 152 to thereby provide a relatively small footprint and consequent low resistance to rolling of the wheel. However, when such wheel is leaned over to one side or the other and high loads represented by the force vectors 110 and 112 (FIG. 6) applied to either cornering shoulder 155 or 156, the resistance to deflection is not as great thereby allowing the peripheral portion of the tire wall to flex and form a larger footprint to thus provide a greater gripping surface and thus a greater resistance to slipping on the underlying surface 166, as a result of the centrifugal cornering forces applied thereto.

Figure 3:
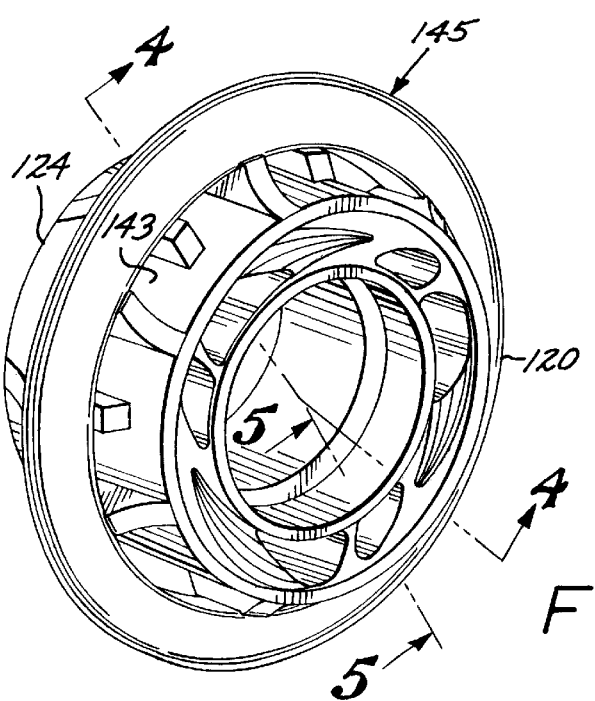
FIG. 3 is a perspective view of a shaped foam core mandrel which may be mounted about the hub shown in FIG. 1.
Figure 8:
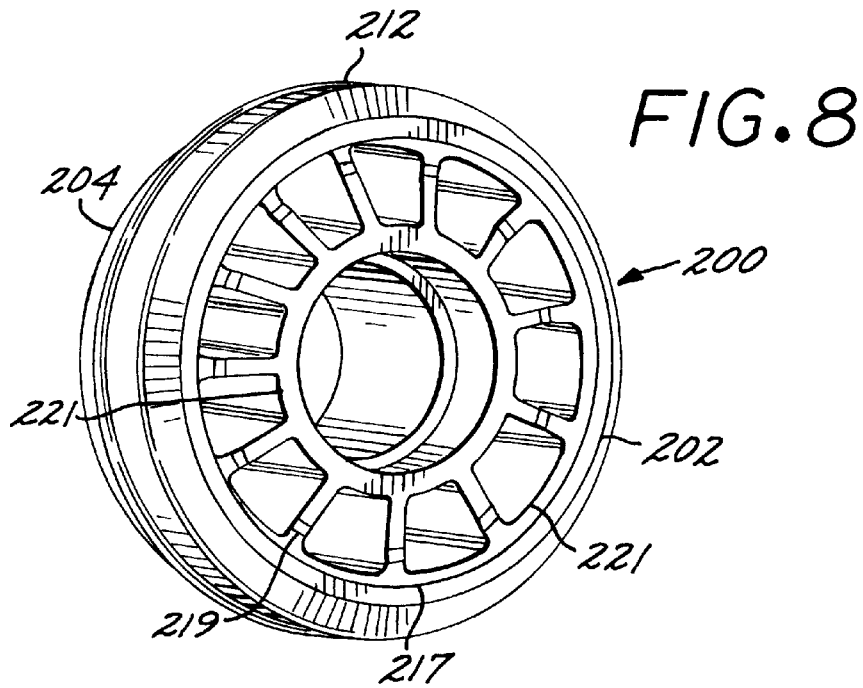
FIG. 8 is a perspective view of a hub which may be incorporated in a second embodiment of the skate wheel embodying the present invention.

Referring To FIGS. 1 and 3 the wheel hub, generally designated 120 is formed of a thin 1 mm thick cylindrical peripheral wall 122 configured with a radially outwardly facing rim surface 124 disposed on a 4 cm diameter having a plurality of radial stand-off ribs in the form of lugs, generally designated 131, which are asymmetric about the central axial plane. The hub is formed with a thin bearing wall 139 concentric within the peripheral wall 122 to form therebetween an annulus having a gridwork with radial spokes 137 formed at the annular ends of triangular shaped lightening holes 135. In this embodiment the respective stand-off ribs are, when view in axial cross section, generally trapezoidal in shape. The stand-off ribs 131 are configured with radially outwardly facing, axial contact surfaces 130 bounded at one axial end by radially outwardly projecting retaining lips 133 that cooperate to provide an annular centering groove. In this regard the contact surfaces 130 cooperate to provide a lotus of respective surfaces, as rotated through a revolution about the central axis, to form a concentric diameter of about 4.3 cm disposed about the outwardly facing rim surface 124. The axial ends of the stand-off rib adjacent the respective lips 133 are formed by respective fillet surfaces 134. The opposite axial end of each rib tapers gradually from a base at the outwardly facing rim surface to provide radially outwardly and axially inwardly angled expander surface 136 inclined at about 20 degrees relative to the central axial plane which terminates at the flat contact surface 130 of the rib 131.

As shown in FIG. 1 the stand-off ribs 131 are spaced equidistant about the radially outwardly facing rim 124 in a single row along the central axial plane to form a circular pattern. Consecutive stand-off ribs 131, as rotated through a revolution about the central axis, are positioned in a mirrored orientation about the centerline of the rim.

Figure 2:
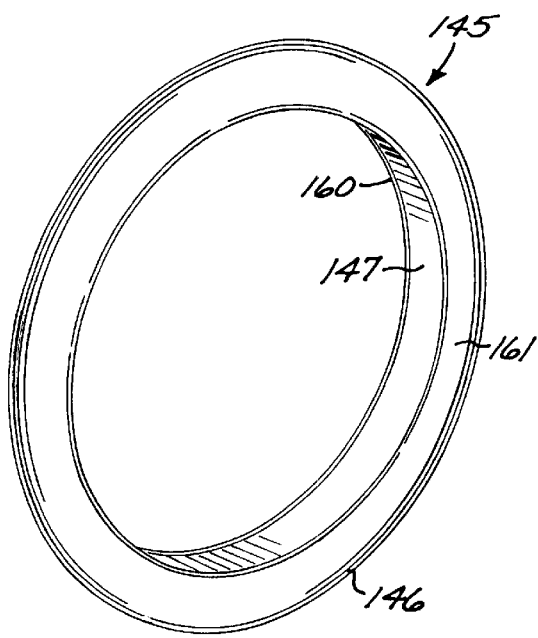
FIG. 2 is a perspective view of a shaped foam core mandrel incorporated in the present embodiment.

Referring to FIG. 2, an annular closed cell foam core mandrel 145 is formed with a cross section defining an isosceles triangle with rounded corners and having a radially inwardly facing nesting surface 147 sized with an interior diameter of about 4.2 cm to be drawn elastically into firm contact with the radially outwardly facing contact surfaces of the respective centering grooves defined by the contact surface 130 to positively space the interior diameter of the mandrel outwardly from the radially outwardly facing rim surface to form axial through space defining pockets 143 for axial flow thereinto of liquid polyurethane. In this embodiment, the mandrel is formed in cross section as an isosceles triangle having a base 147 about 6 mm wide and with opposite sides 161 and 162 angling radially outwardly and axially inwardly at an angle of 30° from the axis to an overall radial height. The vertices of the triangular cross section are configured with rounded corners having external corner radii of approximately 2 mm at the two base vertices and a radius of approximately 1.3 mm at the radial apex.

One embodiment of the shaped foam core mandrel 145 utilizes a closed cell polyurethane foam with a firmness rating between 4 and 10 having an integral skin, generally designated 146, which allows for limited out-gassing during the exothermic application of open cast molding of the polyurethane tire. In this embodiment the integral parametric urethane skin has a minimum thickness of 0.5 mm which encapsulates the porous foam material. A variety of manufacturing methods may be use to produce the encapsulated shaped foam core structure including: compression molding of sheet stock to a shaped foam core, RF welding a urethane sheet over the shaped foam insert, or RIM molded polyurethane closed cell foam. In compression molding, it has been found advantageous to construct the mandrel by cutting an oversized toric shape from a sheet of closed cell foam stock to form a toric blank having a central diameter corresponding with that of the intended mandrel. The blank is then placed in a mandrel compression mold having a cavity corresponding with the dimensions of the finished mandrel. The mandrel compression mold is then closed on the blank to compress its outer dimension down to that of the finished mandrel. The mold is heated to a temperature sufficient to at least partially melt the surface cells of the bland to form a layer of melted polyurethane which, upon cooling will form a film defining the nearly impermeable parametrical skin 146 which will resist flow of gases such as air therethrough.

Those skilled in the art will realize that in further embodiments various foam materials including cellular foams and closed cell foams with different densities and amounts of porosity may be used to produce the shaped foam core construction. It will be appreciated by those skilled in the art that the object of providing a high performance in-line hockey skate is achieved by forming the cross section of the mandrel 145 so that the resultant walls of the tire 151, when bonded to the hub, will afford minimum flexure from loads applied at angles corresponding to or close to the central plane of the wheel but will flex to a greater degree when that same or greater forces are applied at an angle of about 30° to 60° from such central plane. It will be appreciated that for other applications the technician may determine the angles of loading for which the various flexure may be desired and may then select the exterior cross sectional configuration and complimentary cavity configuration necessary to provide the preferred cross sectional tire wall which will provide the desired degrees of flexure for those various loadings. That is, in some instances the cross section of the cavity to be defined by the mandrel may be, for instance, trapezoidal.

Referring to FIGS. 6 and 7, it will be appreciated that the triangular cross sectional shape of the mandrel 145 cooperates with the parabolic tread surface to form tire body 151 in somewhat of a U-shaped arch to form oppositely disposed side walls, generally designated 157 and 158 which cooperate to encapsulate the radially distal side and axial opposite side of the mandrel 145 as well as substantially encapsulating the radially inner sides thereof to form a high integrity tire body which tends to hold its uninflated shape while providing for preferential flexing of the turning shoulders 155 and 156. Referring to FIGS. 6 and 7, as noted above, the tire body 151 is shaped in cross section to form, in the opposite legs of the U shape, side walls 157 and 158 which project radially inwardly and terminate at their respective radially inward extremities in end surfaces 163 and 164, respectively, which abut against and are bonded to the rim wall 120. Referring to FIGS. 6 and 7, the exterior surface of such side walls 157 and 158 angle radially inwardly and axially outwardly away from one another and then turn to project radially inwardly in respective radial planes to define radial, axially outwardly facing surfaces 138 and 140 defining the laterally opposite sides of the tire. Such surfaces 138 and 140 are spaced axially apart a distance of 8 mm. At about the diameter corresponding with the maximus axial width of the mandrel the tread surface curves axially and radially inwardly gradually reducing at a radius of curvature to form a somewhat flattened curved tread surface approximating a straight line nearly parallel with the opposite sides 161 and 162 of the mandrel to define the tread surface of turning shoulders. It will thus be appreciated that, with this construction, the side walls 161 and 162 of such mandrel converge toward one another in the radially outward direction at an angle of about 60°. Likewise, the tire body side walls extend along the opposite sides 161 and 162 of the mandrel to themselves converge toward one another along their radially medial portions, at an angle of about 60° to one another.

As shown in FIGS. 4–7 in final assembly the shaped foam core mandrel may be drawn over the hub from either axial side. The workman may gasp the shaped foam core mandrel and place the radially inwardly facing nesting surface 147 of one diametrical side of the mandrel on centering grooves defined by the contact surface 130 of three or four respective stand-off ribs 131 and then drawing the other diametrical side axially onto the hub, causing the inner diameter of such mandrel to ride radially outwardly on the expander ramps 141 and fillets 134 to stretch such mandrel slightly enabling such other diametrical side to, upon the continued application of the assembly force thereto, slide radially outwardly over the respective ramps, to pass axially over the respective axial lips 133 to then engage the radial outer extent of the centering groove defined by the surfaces 133. The inherent elasticity of the foam mandrel, coupled with the bias exterted by the pressurized air withing the perimetrical skin 145, will then tend to urge the interior diameter of such mandrel defining the base 145 to hold such mandrel firmly nested in the centering grooves. The hub and mandrel combination may then be placed, for instance, a casting into a mold as shown in applicant's U.S. Pat. No. 5,641,365, the mold closed, and liquid polyurethane at a temperature of about 180 degrees Fahrenheit poured into the mold cavity defining the exterior shape of the tire body. In the preferred embodiment the tire body is formed by cast molding with thermoset polyurethane. In practice it will be appreciated by those skilled in the art that such tire may also be formed in an injection mold. In any event, the liquid polyurethane will flow about the cavity of the mold and around the body of the shaped foam core mandrel to form axial bridges on the radial interior of such mandrel 145 and form a secure bond between the tire body and hub at the interface of the tire wall ends 163 and 165 as well as with the outer surface 124 of the wall 122 and with the surface of the stand-off ribs 131.

As the increased pressure further pressurizes the foam core mandrel, such pressure will urge the walls 160, 161, and 162 toward the distended triangular configuration defined by the cooperating cellular structure and skin 145 to establish an even more rigid triangular cross section as shown in FIG. 4 while enhancing the radially inwardly acting pressure on the interior diameter of such mandrel to press it even more tightly into the centering groove defined by the surface 130 to hold the mandrel even more firmly and securely disposed symmetrically in the central axial plane tending to resist any asymmetrical forces thereof that might have been created by weight and pressure of the liquid thermoset polyurethane. Thus, the foam core mandrel and consequent triangular shaped cavity 154 will be maintained centered in the mold cavity so the tire body will be formed symmetrically thereabout to substantially fully encapsulate such mandrel to define a high integrity support structure about an annular cavity which is light weight is so light weight it approaches the performance of a low pressure hollow cavity. As the wheel is removed from the mold and allowed to cool, the temperature will likewise drop in the fixed volume mandrel allowing such trapped air to contract and reduce the internal pressure to about 5 psi and reduce the distending forces applied to the walls 163 and 164 of the tire body thus reducing the tendency of the pressure in such mandrel to resist localized inward deflection of the side walls 157 and 158 as will be described hereinafter.

Those skilled in the art of in-line skate tires will appreciate that various load bearing side wall 157 and 158 and rolling surface 153 thicknesses may be produced by utilizing foam core mandrels with different cross-sectional shapes and sizes. By altering the load bearing side wall and rolling surface thickness, tire performance characteristics may be tailored to the requirements of specific skating surfaces, skating conditions and skating maneuvers. For instance during substantially straight line skating, where speed is desired, a solid tire which deforms little under load and which minimizes the footprint area of the tire that comes in contact with the support surface reduces frictional drag for optimal performance. Alternately, during turning maneuvers maximum traction is desired which requires a soft, more flexible tire body capable of deforming under skating loads to provide and increased footprint area. It will be appreciated that foam core mandrel having a triangular cross sectional shape in the present embodiment establishes a preconditioned cavity which cooperates with the surrounding load bearing walls 157 and 158 and rolling surface 152 of the tire body to enable the tire to exhibit a variety of defection characteristics which optimize the overall wheel performance. It will be appreciated that the triangular shape of the cavity 154 compliments the parabolic U-shape of the tread surface so as to define a relatively large area for such cavity within the walls 157 and 158 while having a fairly substantial straight line or divergent columnar wall support on opposite sides of such cavity leading directly to the annular wall ends 163 and 164 bonded to the rim surface 124. This thus serves to provide a wall structure which is relatively light weight to facilitate quick foot movement for the skater having four or more such wheels per skate while providing relatively low flex support with the wheel is erect and significantly higher flex support with wheel of the skate leaned over at about 30° to the vertical. During upright straight line skating the wheel of the present embodiment will distribute the compressive force of the skater's weight relatively evenly down from the bonded ends 163 and 164 through the axially inwardly arching load bearing side walls 157 and 158 generally around the cavity 154 to the bottom most extent of the tire body deforming the rolling surface 152. The generally V cross sectional shape of the cavity 154 produces relatively straight force paths on the opposite sides of the isosceles triangle shape thus providing generally column loading without excessive outward curvature in the walls of such cavities 154 which could result in the load tending to squat the tire body thereby creating a footprint having a wider axial extent and thus greater resistance to rolling. In contrast during tight high speed turning maneuvers, the wheel is angled relative to the support surface and one or the other turning shoulders 155 and 156 along the profile of the tire is engaged with the support surface. In this orientation, the reactive load from the surface 166 will act generally along, for instance, a line about perpendicular to the angle of the near side wall 161 or 162, as the case may be, of the cavity 154, thus applying a moment to the corresponding side wall tending to flex the radially outer extent axially away from the surface 166 thereby flexing the radially distal portion of the tire body away from such surface 166 to thus increase the cross sectional radius of curvature of the ground contacting shoulder 155 or 156. This then tends to flatten the peripheral surface of that contacting surface to cooperate with the tendency of that contacting wall 157 or 158 to flex inwardly toward the center of the essentially hollow cavity 154 to generate a relatively larger surface 166. The greater contact surface provides improved traction into the turn.

In operation, it will be appreciated that wheels of the construction shown in FIGS. 6 and 7 may be mounted in line on a skate frame to be positioned one behind another. The wearer, then participating in an active regiment, such as hockey or other active maneuvers, on underlying terrain, such as hardwood floors, concrete, asphalt or the like, may execute highly athletic maneuvers applying substantial forces to the tire. It will be appreciated by those skilled in the art that when, for instance, a sharp turn is being made at high speeds, the skate and consequently the wheels will be laid over on a sharply inclined angle, as for instance 40° to 60° to the horizontal, such converging shoulder 155 or 156 (FIG. 7) may be contacted with a support surface 166 such that the wheels on that skate cooperate in carrying the weight of that portion of the skater applied thereto as well as the high centrifugal forces created by a high speed turn. It will be appreciated that such maneuvers serve to apply high tangential forces to the surface of the tire as resisted by contact with the underlying terrain. It will be appreciated that for heavier or more aggressive skaters the centrifugal forces and vertical components thereof will be greater thus tending to increase the moment applied to the supporting wall 157 or 158 thus increasing the flexing of the axial distal extent, and consequent flattening of the contacting shoulder 155 or 156 and thus increasing the size of the footprint. This then enhances the safety and performance of operation for the skater and contributes to the long service life of the wheel by minimizing abrasion and scuffing which might otherwise result in early wearing away of the surface of such tire and consequent permanent deformation requiring replacement in order to maintain high performance characteristics.

In an alternate preferred embodiment as shown in FIGS. 8–11, construction thereof is similar to that described hereinabove, except that the wheel incorporates a hub, generally designated 200, formed of a thin, 1 mm thick cylindrical peripheral wall 202 configured with a radially outwardly facing surface 204 disposed on a 4 cm diameter having the stand-off ribs 212 centered thereon about the central axial plane of the hub. The hub is formed with a thin bearing wall 221 concentric within the peripheral wall 202 to form therebetween an annulus having a gridwork with radial spokes 219 formed at the annular ends of trapezoidal shaped lightening holes 217. In this preferred embodiment the respective stand-off ribs are configured with, when viewed in axial cross section, a columnar shape and terminates at their respective radially outer ends in respective centering grooves 208 flanked on their opposite sides by annular retaining flanges 206 which terminate at their radially distal ends in annular cam segments 205, over which the radially inner surface of the mandrel may slide during assembly. The centering grooves are configured with radially outwardly facing nesting surfaces 207 which cooperate to provide a lotus of respective surfaces, as rotated through a revolution about the central axis, to form a concentric diameter of about 4.3 cm disposed about the surface of the outwardly facing rim surface 204. The axial ends of the stand-off ribs 212 taper gradually from filleted bases at the outwardly facing rim surface to provide radially outwardly and axially inwardly angling expander ramps 215. The expander ramps 215 angle axially inwardly and radially outwardly to provide axially outwardly facing surfaces inclined at about 20° relative to the central axial plane.

Figure 9:
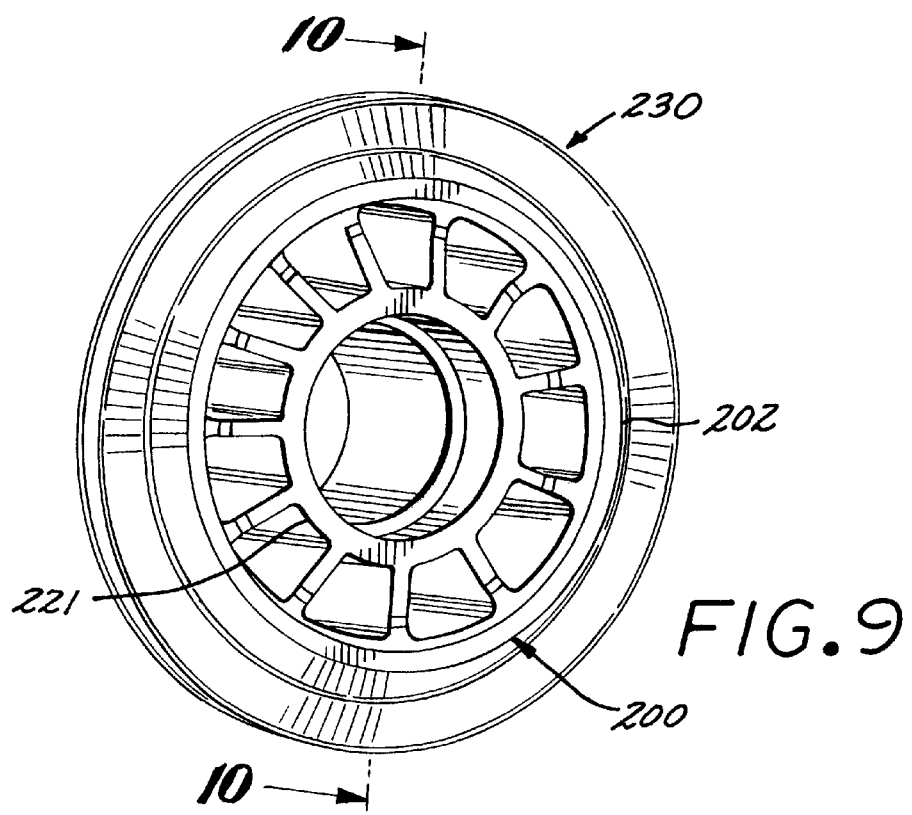
FIG. 9 is a perspective view of a shaped foam core mandrel mounted about the hub shown in FIG. 8.
Figure 10:
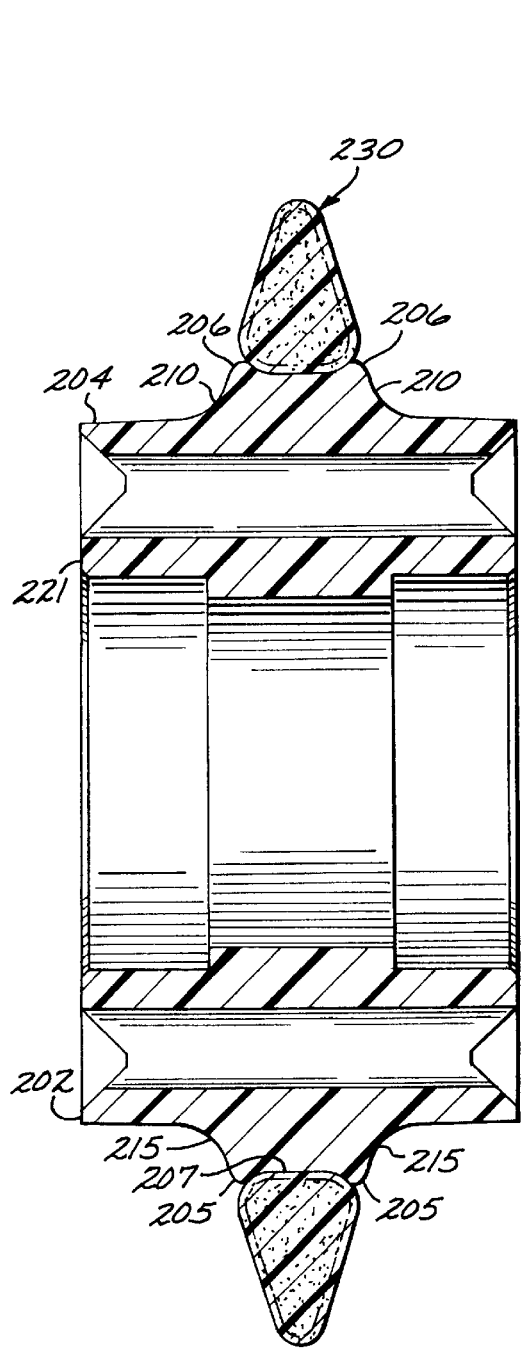
FIG. 10 is an enlarged cross-sectional view taken along line 10—10 of FIG. 9.
Figure 11:
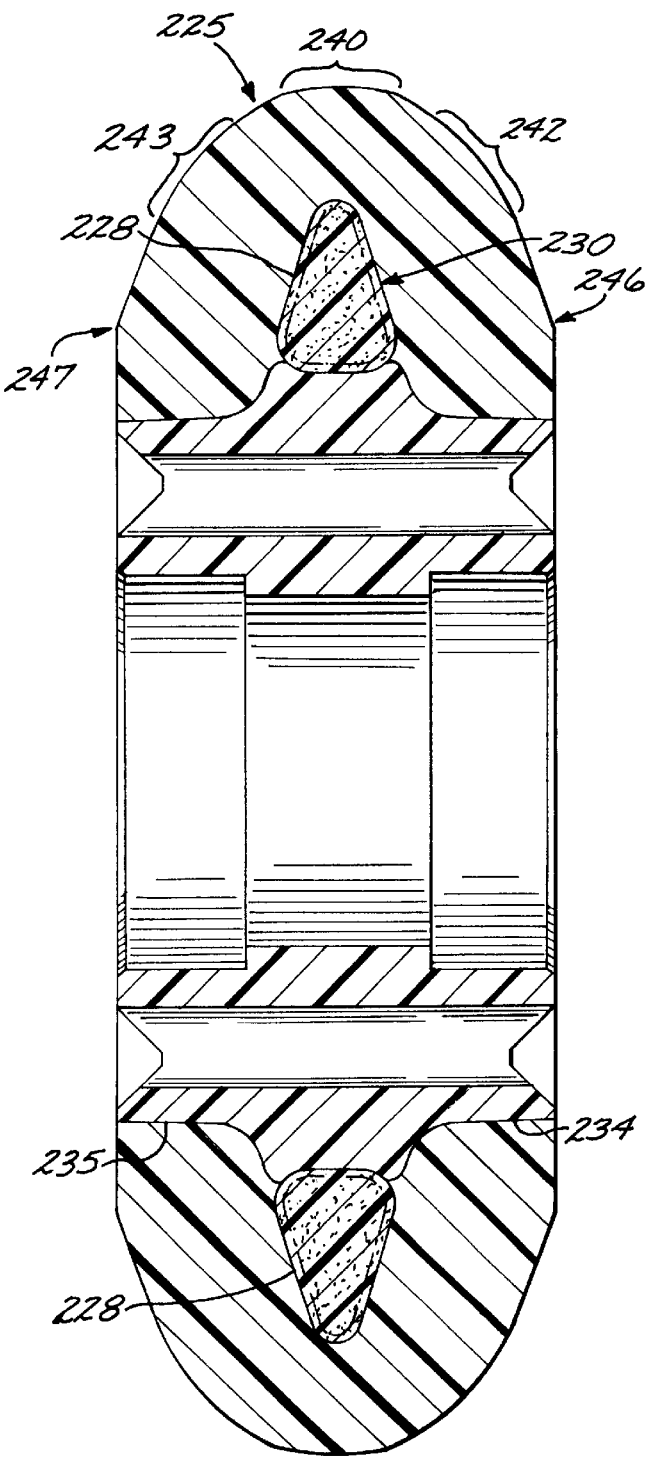
FIG. 11 is a cross-sectional view, similar to FIG. 10, but showing the tire body molded on the hub around the shaped foam core mandrel.

Referring to FIGS. 9–11 the shaped foam core mandrel 230 in final assembly may be drawn over the hub 200 from either axial side. The workman may gasp the shaped foam core mandrel and place the radially inwardly facing nesting surface 207 of one diametrical side of the mandrel on contact surfaces 207 of three or four respective stand-off ribs 212 and then drawing the other diametrical side onto the hub, causing the inner diameter of such mandrel to ride radially outwardly on the ramping surfaces 215 to stretch such foam core enabling such other diametrical side, upon the continued application of the assembly force thereto to slide radially outwardly over such ramps, to pass axially over the respective axial cam surfaces 205 to then engage the radial outer extent of the respective nesting surfaces. The elasticity of the foam core mandrel will then tend to draw such mandrel radially inwardly causing the radially and axially inner edge thereof to ride radially and axially inwardly on such cam surfaces provided on the retaining flanges 206 to be directed into the respective nesting surfaces thus automatically centering such mandrel in the axial center of the hub. The inherent elasticity of the foam core mandrel 230 will draw it radially inwardly to firmly nest it loosely in the centering notches causing the symmetrically shaped body of such partially pressurized mandrel to be held in a position symmetrical about the axially centered plane such hub. The hub and mandrel combination may then be placed into a mold, the mold closed, and liquid polyurethane poured into the mold cavity defining the exterior shape of the tire body at a temperature of about 180 degrees Fahrenheit. The liquid polyurethane will flow about the cavity of the mold and around the body of the shaped foam core mandrel to form axial bridges on the radial interior of such mandrel 230 and form a secure bond between the tire body and hub at the interface of the tire wall ends 234 and 235 as well as with the outer surface 204 of the wall 202 and with the surface of the stand-off ribs 212.

It will be appreciated by those skilled in the art that the foam core mandrel 230 will cooperate with the surrounding polyurethane tire body 225 to form a preconditioned encapsulation space 228. The encapsulation space 228 is defined by the shape of the foam core mandrel and provides a localized region within the tire body having different material properties and which is more flexible and more capable of deformation when exposed to skating loads compared to the wheel composed of a solid polyurethane tire body construction.

It will also be appreciated that the foam core mandrel 230 having a triangular cross sectional shape in the present embodiment cooperates with the surrounding load bearing walls 246 and 247 and rolling surface 240 of the tire body to enable the tire to exhibit a variety of deflection characteristics which optimize the overall wheel performance in substantially the same manner as discussed in the first embodiment of the present invention. Likewise the triangular shaped cavity 228 complements the parabolic U-shape of the tread surface and cooperates with turning shoulders 242 and 243 and rolling surface 240 to provide preferential displacement of the tire body during straight line skating and high performance turning maneuvers.

From the foregoing, it will be appreciated that the in-line skate wheel of the present invention provides an efficient and convenient means for manufacturing a polyurethane in-line skate wheel that will provide good support and a wide range of selected different tire deformation characteristics. The wheel is formed with tire walls of a desired cross sectional shape dictated by a light weight foam mandrel defining a low density compressible core. The mandrel may be configured with multiple different cross sectional shapes to provide the desired cross sectional shape for the tire wall depending on the performance characteristics sought.

What is claimed:

1. An in-line roller skate wheel comprising:
   relatively rigid cylindrical urethane hub formed about an axial center and configured with an annular radially outwardly facing rim surface and radial stand off ribs disposed in annular spaced relation about said surface and projecting radially outwardly to terminate in radially outwardly facing nesting surfaces;
   an annular foam mandrel concentric about said axial center and having a predetermined enlarged diameter, said mandrel contacted on its radially inner side with the respective said nesting surfaces, said mandrel being triangular in the axial transverse cross section to form an isosceles triangle having opposite side walls converging radially outwardly and axially inwardly toward one another at a predetermined angle; and
   a relatively soft urethane tire body substantially surrounding said mandrel and being bonded to said rim surface, said body being formed with side walls disposed on the opposite axial sides of said mandrel and, for a portion of the radial extent, converging radially outwardly and axially inwardly toward one another at said predetermined angle to complement the angle at which said opposite side walls of said mandrel converge toward one another, said body being formed at its radially outer extent with a tread surface rounded in the axial transverse plane.

2. An in-line roller skate wheel according to claim 1 wherein:
   said mandrel is formed with its said side walls converging toward one another in the radially outward direction to define said predetermined angle at 60°.

3. An in-line roller skate wheel according to claim 2 wherein:
   said mandrel is elastic and constructed with a relaxed internal diameter less than said predetermined diameter to provide for stretching of said mandrel during assembly to nest firmly on said nesting surfaces.

4. The skate wheel of claim 1 wherein:
   said mandrel is constructed of porous foam encased in urethane skin.

5. The skate wheel of claim 4 wherein:
   said porous foam is constructed to contain thermally expansive gas to expand and distend said skin upon heating during manufacture of said tire body.

6. The skate wheel of claim 4 wherein:
   said foam is constructed with a firmness rating between 4 and 10.

7. The skate wheel of claim 1 wherein:
   said mandrel includes pressurized gas encased in said skin.

8. The skate wheel of claim 7 wherein:
   said mandrel is pressurized to about 5 psi.

9. The skate wheel of claim 1 wherein:
   some of said ribs are formed with retaining flanges projecting radially outwardly beyond said nesting surfaces on one axial side of said mandrel to define stops limiting axial movement in one direction of said mandrel during manufacture.

10. The skate wheel of claim 9 wherein:
    some of said ribs include flanges projecting radially outwardly beyond said nesting surfaces on the axial side of said mandrel opposite said one side to limit axial movement of said mandrel in the direction opposite said one direction during manufacture.

\* \* \* \* \*